(12) United States Patent
Benzatti et al.

(10) Patent No.: US 11,954,161 B2
(45) Date of Patent: Apr. 9, 2024

(54) MULTI-CONTENT RECOMMENDATION SYSTEM COMBINING USER MODEL, ITEM MODEL AND REAL TIME SIGNALS

(71) Applicant: Microsoft Technology Licensing, LLC, Redmond, WA (US)

(72) Inventors: Danilo L. Benzatti, Redmond, WA (US); Rajasi Saha, Sammamish, WA (US); Christopher J. Mallery, Kirkland, WA (US); Michael Y. Moon, Bellevue, WA (US); Saliha Azzam, Redmond, WA (US); Xiaoguang Qi, Bellevue, WA (US); Harish Jayanti, Redmond, WA (US); Jayaram N. M. Nanduri, Issaquah, WA (US); Chad A. Zanonie, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 485 days.

(21) Appl. No.: 15/994,530

(22) Filed: May 31, 2018

(65) Prior Publication Data

US 2019/0373331 A1    Dec. 5, 2019

(51) Int. Cl.
*G06F 16/00*    (2019.01)
*G06F 16/438*    (2019.01)
(Continued)

(52) U.S. Cl.
CPC ........ *G06F 16/9535* (2019.01); *G06F 16/438* (2019.01); *H04N 21/4662* (2013.01);
(Continued)

(58) Field of Classification Search
CPC .............. G06F 16/438; G06F 16/9535; G06F 16/435; H04N 21/4826; H04N 21/4662; H04N 21/4668
See application file for complete search history.

(56) References Cited

U.S. PATENT DOCUMENTS

2013/0066673 A1    3/2013    Rose et al.
2014/0274354 A1*   9/2014    George .............. G06Q 30/0631
                                                          463/29
(Continued)

FOREIGN PATENT DOCUMENTS

WO    2008147718 A1    12/2008
WO    2014149199 A1     9/2014

OTHER PUBLICATIONS

"International Search Report and Written Opinion Issued in PCT Application No. PCT/US2019/032545", dated Aug. 5, 2019, 12 Pages.

*Primary Examiner* — Paul Kim
(74) *Attorney, Agent, or Firm* — Weaver IP L.L.C.

(57) ABSTRACT

Methods, systems, apparatuses, and computer program products are described for providing content recommendations to a requestor. In implementations, user event records associated with media items and content types may be stored, for instance, in an event catalog. A set of user scores may be generated based on a user-content score model and the user event records, where each generated user score represents an affinity between a user and a corresponding content type of the plurality of content types. A set of title scores may also be generated for a media item based on a title-content score model, where each generated title score represents an affinity between the media item and a corresponding content type. In response to a request, the sets of
(Continued)

scores may be combined to generate a set of content recommendations to provide to the requestor.

20 Claims, 5 Drawing Sheets

(51) Int. Cl.
    *G06F 16/9535*    (2019.01)
    *H04N 21/466*     (2011.01)
    *H04N 21/482*     (2011.01)
    *G06F 16/435*     (2019.01)

(52) U.S. Cl.
    CPC ..... *H04N 21/4668* (2013.01); *H04N 21/4826* (2013.01); *G06F 16/435* (2019.01)

(56) References Cited

U.S. PATENT DOCUMENTS

| | | | | |
|---|---|---|---|---|
| 2015/0099589 A1* | 4/2015 | Smith | ........... | G06Q 30/0255 463/42 |
| 2017/0124593 A1* | 5/2017 | Nickerson | ........... | H04L 12/1859 |
| 2018/0189693 A1* | 7/2018 | Newhouse | ........... | G06Q 10/0631 |

\* cited by examiner

MULTI-CONTENT RECOMMENDATION SYSTEM COMBINING USER MODEL, ITEM MODEL AND REAL TIME SIGNALS

BACKGROUND

Users may interact with a wide variety of multimedia content on computing devices, such as desktop computers, laptops, mobile devices, and gaming consoles. For example, users may access video content, image content, audio content, gaming content, etc., on a single computing device. In many instances, such content may be suggested to a user based on an overall popularity of the content. Where popularity trends are relied upon in systems that suggest content to users, it is assumed that users are more likely to access the same content that other users have accessed. However, systems which suggest content based solely on popularity trends result in users all being shown the same content offerings.

In addition, on certain devices such as gaming consoles, while content may be suggested to a user as described above using popularity trends, the quantity of content offerings that may be displayed at once is typically limited by the space available on a graphical user interface generated by the console (e.g., displayed on a television or other display screen). Furthermore, where the user interface comprises static interface elements (e.g., a menu bar or the like), the amount of space available for displaying content options becomes even more limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for providing content recommendations to a requestor. In implementations, user event records associated with media items and content types may be stored, for instance, in an event catalog. Based on the user event records, media items, and content types, two sets of scores may be generated representing a predicted interaction level with a plurality of content types. A set of user scores may be generated based on a user-content score model and the user event records, where each generated user score represents an affinity between a user and a corresponding content type of the plurality of content types. A set of title scores may also be generated for a media item based on a title-content score model, where each generated title score represents an affinity between the media item and a corresponding content type. In response to a request, the sets of scores may be combined to generate a set of content recommendations to provide to a requestor.

In this manner, content recommendations may be generated and provided based both on a particular user's affinity towards various content types, as well as an affinity between a particular title and the same content types across a larger population of users in real-time. Such a real-time combination of scores enables a system to generate high quality content recommendations for a particular user and title with reduced latency.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
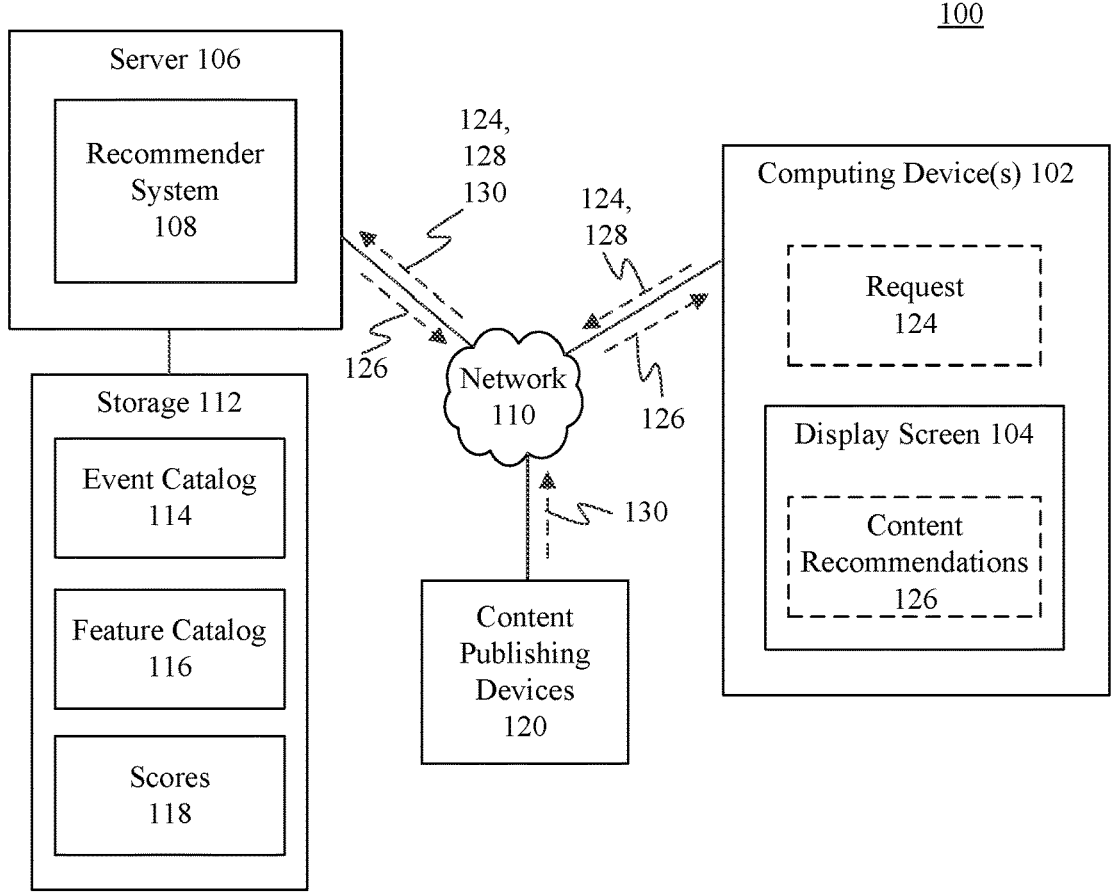
FIG. 1 shows a block diagram of a system for providing content recommendations to a computing device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

As noted in the Background section above, users may interact with a wide variety of multimedia content on computing devices, such as desktop computers, laptops, mobile devices, and gaming consoles. For example, users may access video content, image content, audio content, gaming content, etc. on a single device. In many instances, such content may be suggested to a user based on an overall popularity of the content. Where popularity trends are relied upon in systems that suggest content to users, it is assumed that users are more likely to access the same content that other users have accessed. However, systems which suggest content based solely on popularity trends results in each user seeing the same content offerings. As a result, an individual user's interests are not taken into consideration, thus decreasing the quality of the suggested content for many users.

In addition, on certain devices such as gaming consoles, while content may be suggested to a user as described above using popularity trends, the quantity of content offerings that may be displayed at once is typically limited by the space available on a graphical user interface of the console. Furthermore, where the user interface comprises static interface elements (e.g., a menu bar or the like), the amount of space available for displaying content options becomes even more limited. Accordingly, the importance of providing highly relevant suggestions to a user becomes even greater.

Embodiments described herein address these and other issues by enabling the generation of content recommendations to be carried out in a quick and efficient manner, while also taking into account various behavioral patterns for an individual user as well across a larger group of users. For instance, two separate sets of affinity scores may be generated based on user event records that are logged in an event catalog. A first set of scores may comprise a set of user scores that represents a propensity for a particular user to engage in each of a plurality of content types. A second set of scores may comprise a set of title scores that represent a propensity that a larger group of users are likely to interact with the same content types (e.g., crowd-based behavioral patterns). Such scores may be combined in real-time in response to receiving a recommendation request to generate a set of content recommendations. In some implementations, the scores may be modified based on any number of other factors or signals, such as a biasing factor, a near real-time signal, and/or a real-time signal.

In this way, an optimal set of content may be recommended to each user, thereby ensuring the user's interest is captured and increasing the user's engagement with the system on which the content is being provided and/or accessed. As a result, the user need not expend significant resources in navigating a user interface to determine which content to access, but rather may be provided relevant content based on the user's actual behavioral habits in combination with a number of other factors, such as habits across a plurality of users for a given title. Because the relevance and quality of recommended content is increased, less display real estate may be used for content recommendation, thus freeing up display space for other graphical user interface elements.

In addition to enhancing a graphical user interface, techniques described herein further enable a reduction of the computing resources for the system responsible for determining content recommendations. For instance, because two separate score models may be implemented and combined in real-time in response to a content recommendation request, the need to perform millions, or even trillions of combinations (e.g., for a system with millions of users and hundreds of thousands of items and numerous content types) to determine content recommendations instantaneously is not needed, thereby reducing the processing resources required. In particular, the two score models of user-content type and media item-content type enable far fewer calculation combinations ((users×content types)+(media items×content types)) compared to the number of calculation combinations for a single, all-encompassing model combining user-media item-content type (users×media items×content types). Further, because content recommendations may utilize fewer resources, the content recommendation system may perform more efficiently, thus reducing latency in responding to content recommendation requests while also allowing for increased breadth and scale.

Example implementations are described as follows that are directed to techniques for recommending content. For instance, FIG. 1 shows a block diagram of an example content recommendation system 100, according to an embodiment. As shown in FIG. 1, system 100 includes one or more computing device(s) 102, and a server 106, a storage 112, one or more content publishing devices 120, which are communicatively coupled by a network 110. Network 110 may comprise one or more networks such as local area networks (LANs), wide area networks (WANs), enterprise networks, the Internet, etc., and may include wired and/or wireless portions. Computing device(s) 102 are communicatively connected to server 106 via network 110. In an implementation, computing device(s) 102 and server 106 may communicate via one or more application programming interfaces (API).

Computing device(s) 102 may each comprise a device configured to output a video signal comprising one or more video frames to a display screen. Computing device(s) 102 may comprise a video game console (e.g., a Microsoft Xbox® of any version, a Sony Play Station® of any version, A Nintendo Wii®, NES, or Switch™ of any version, etc.), a desktop computer, a portable computer, a smartphone, a tablet, a wearable computing device, a head mounted gaming device, a mixed and/or virtual reality device (e.g., Microsoft HoloLens™), or any other processing device for executing a video game and outputting video frames generated by the video game to a display device. It is understood that although computing device(s) 102 are described in example embodiments as relating to gaming devices, computing device(s) 102 may comprise any type of electronic device (computer, smartphone, tablet, etc.) capable of displaying (e.g., on a screen) or playing back (e.g., on a speaker or the like) any type of multimedia content, such as video content, audio content, audio/video content, images, etc. An example computing device that may incorporate the functionality of one of computing device(s) 102 is described below in reference to FIG. 7.

As shown in FIG. 1, each of computing device(s) 102 include a display screen 104. Display screen 104 may comprise any type of display suitable for receiving and displaying video frames generated by a video game. For instance, display screen 104 may be a liquid crystal display, cathode ray tube display, light-emitting diode display, a plasma display, a display screen of a projector television, or any other type of display that may be coupled to one of computing device(s) 102 through a suitable interface. Display screen 104 of one of computing device(s) 102 may either be external to or incorporated in one of computing device(s) 102.

In accordance with example embodiments, display screen 104 may present a set of content recommendations 126 via a graphical user interface. Content recommendations 126 may include one or more items of content recommended for interaction by a user of one of computing device(s) 102. In accordance with implementations, one of computing device(s) 102 may transmit a request 124 comprising a request for content recommendations to server 126 over network 110. In response to request 124, display screen 104 may receive and display content recommendations 126 based on a number of factors, as described below. In implementations, a user of one of computing device(s) 102 may interact with the computing device (e.g., via a voice interaction, a touch input interaction, a keyboard interaction, a pointing device interaction, a game controller or joystick interaction, etc.) to select a particular item for interaction, such as viewing or playback.

As shown in FIG. 1, server 106 comprises a recommender system 108. In implementations, recommender system 108 is configured to provide content recommendations 126 to computing device(s) 102, as described in more detail below. Server 106 may include one or more server devices and/or other computing devices comprising, for instance, a cloud-based computing platform. Server 106 may also be communicatively coupled to storage 112. As shown in FIG. 1, storage 112 comprises an event catalog 114, a feature catalog 116, and scores 118.

Event catalog 114 is configured to store a plurality of user event records 128 associated with computing device(s) 102. User event records 128 may comprise, for instance, an identity of a user (e.g., a name, email address, alias, etc.) of one of computing device(s) 102 and one more actions performed on the computing device. For example, user event records 128 may indicate that a particular user accessed a certain content type associated with an item of media content, such as a video game. In some implementations, user event records 128 may also identity a timestamp or duration associated with each such logged event record. As an illustrative example, a user event record 128 may indicate that a particular user of one of computing device(s) 102 joined a certain multi-player game, and interacted with the game for a certain period of time. Further examples of user event records 128 for a user may indicate the user quit a game, earned an achievement in a game, reached a particular score in a game, shared an image or video clip from a game, made an in-game purchase, etc.

Event catalog 114 may store each such event record for each user. In implementations, event catalog 114 may store user event records associated with hundreds, thousands, millions, and even greater numbers of users over an entire ecosystem. Event catalog 114 may comprise any suitable data structure for storing such user event records, including but not limited to a database, a spreadsheet, a table, a log file, etc.

Feature catalog 116 is configured to store data regarding one or more features used by recommender system 108, as described below, to generate content recommendations 126. Feature catalog 116 may store, for instance, machine-learning based features generated or derived from user event records 128 stored in event catalog 114. In some implementations, feature catalog 116 may comprise machine-learning based features based on an aggregation of user event records obtained from event catalog 114.

As shown in FIG. 1, scores 118 comprise a repository of scores utilized by recommender system 108 to generate content recommendations 126. In implementations, scores 118 may comprise user scores and title scores. User scores may indicate, for instance, a particular user's affinity to interact with each of a plurality of different content types. In example embodiments, a separate set of user scores may be assigned to each user. In this manner, each user's particular affinity for various content types may be determined, thus enabling recommender system 108 to generate content recommendations 126 that are personalized to each user. In some implementations, user scores representing a particular user's affinity or likelihood of interaction with various content types are generated irrespective of a game title. In an illustrative example, user scores may identify a particular user's affinity or likelihood of interaction with a screenshot, joining a multiplayer game, viewing a live game broadcast, accessing activity from the user's social network or other popular users, accessing leaderboard updates, etc., across a plurality of games for which the user has interacted. Where a user is more likely to watch a live broadcast of a game than to access a leaderboard update, for instance, the user scores associated with the live broadcasts content type may be higher than the score corresponding to the leaderboard update content type.

Title scores may indicate, for each of the plurality of content types, a score representing a user's likely engagement with each content type for a particular game (a "game title" or just "title"). In implementations, title scores may be generated based on a plurality of users (e.g., some or all users of a particular game) and thus not personalized to any individual user. For example, title scores may include a score representing a predicted interaction that an average user will access each of a plurality of content types, such as a screenshot, joining a multiplayer game, viewing a live game broadcast, accessing activity from user's social network or other popular users, accessing leaderboard updates, etc., for a particular title.

While some content may originate or be derived from publishers, editorial programming and community managers, many types of content may be generated or derived from users of computing device(s) 102. Content types as described herein may include, but are not limited to: friends online playing a joinable game session; looking for group content (LFG) (e.g., an available LFG count, or an LFG posted by a friend or club member, a tournament LFG posted by a friend or club member); tournament details for registered users; game started supporting tournaments; club recommendations; a friend finder (e.g., via one or more social media platforms); a friend suggestion/recommendation; a friend currently broadcasting or co-broadcasting; popular media posts (e.g., community game clips or screenshots); popular community broadcasts; community manager posts; achievement suggestions (e.g., rarest unearned achievement across games, most common unearned achievement across games, closest via progression across games, such as closest to unlock or completion, remaining gamer score or achievements available across games, close behind a next user in a gamer score leaderboard); a leaderboard suggestion (e.g., close behind a next user in a stats leaderboard or a stats leaderboard snapshot); store content (e.g., recently released unowned downloadable content or other downloadable content recommendation), and/or any other suitable content types. It is noted that content types may also be clustered and/or categorized in accordance with techniques described here. For instance, scores may be generated based on clusters or categories of content types (e.g., LFG related content).

By implementing a wide variety of content types for which user and title scores are generated, personalized recommendations may be delivered to users across a wide range of behavioral patterns, ranging from social to non-social, solo to multiplayer, casual to achievement hunter, content producer to content consumer, etc.

Although event catalog 114, feature catalog 116, and scores 116 are shown in FIG. 1 as being implemented in storage 112, it is understood that these components may be implemented in or distributed across one or more additional storage devices not shown. Furthermore, storage 112 may be implemented separate from server 106, implemented within server 106, and/or may be located remotely such that storage 112 may be accessed by server 106 via network 110. Storage 112 may comprise any type of physical storage device, including but not limited to one or more local storage devices, and/or one or more cloud-based storages, such as hard disk drives, solid state drives, random access memory (RAM) devices, etc.

Content publishing devices 120 include devices of administrators, managers (e.g., community managers), publishers, and/or game users that identify, rank, and/or publish content 130 that may be utilized by recommender system 108 in generating content recommendations 126. Content 130 transmitted by content publishing devices 120 may include messages, screenshots, video game clips, bulletin board or community postings, articles, etc., related to a particular title (e.g., a game). In some implementations, recommender system 108 may determine whether some or all of content 130 posted by a community manager may be included in content recommendations 126. In implementations, content publishing devices may comprise any type of computing device (e.g., desktop computer, portable computer, smartphone, tablet, wearable device, etc.), including but not limited to computing devices described above with respect to one of computing device(s) 102.

Computing device(s) 102, content publishing devices 120, and server 106 may each include at least one network interface that enables communications with each other over network 110 Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 110 include a local area network (LAN), a wide area network (WAN), a personal area network (PAN), and/or a combination of communication networks, such as the Internet.

Figure 2:
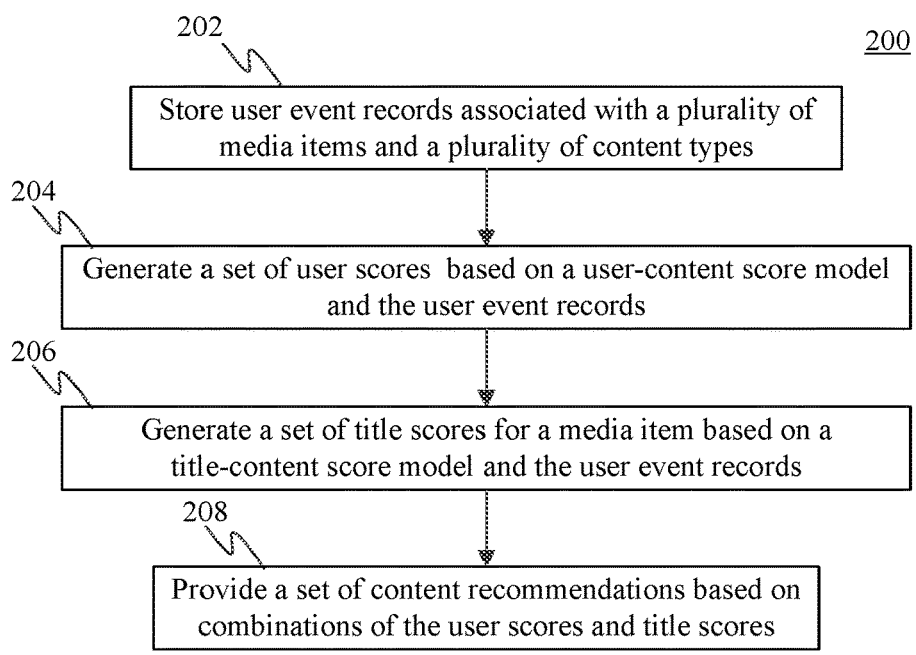
FIG. 2 shows a flowchart providing a process for generating a set of content recommendations based on user scores and title scores for a requestor, according to an example embodiment.
Figure 3:
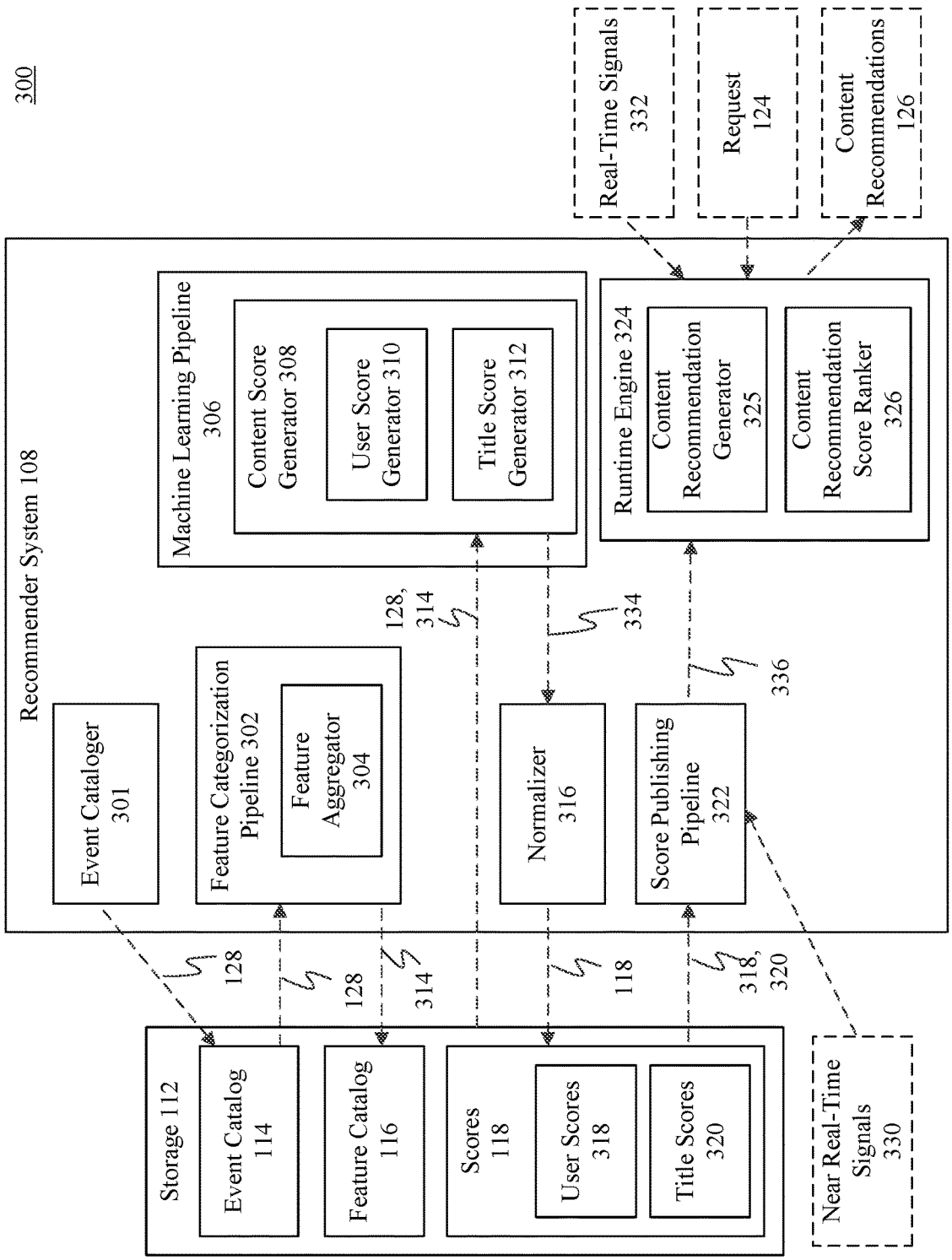
FIG. 3 shows a block diagram of a computing system comprising a recommender system for providing content recommendations, according to an example embodiment.

Recommender system 108 may operate in various ways to generate a content recommendation, in embodiments. For instance, recommender system 108 may operate according to FIG. 2. FIG. 2 shows a flowchart 200 for providing a set of content recommendations based on user scores and title scores, according to an example embodiment. Flowchart 200 and recommender system 108 are described as follows with respect to FIG. 3. FIG. 3 shows a block diagram of a computing system 300, according to an example embodiment. As shown in FIG. 3, system 300 comprises recommender system 108 and storage 112. Recommender system 108 includes an event cataloger 301, a feature categorization pipeline 302, a machine learning pipeline 306, a normalizer 316, a score publishing pipeline 322, and a runtime engine 324. Feature categorization pipeline 302 includes a feature aggregator 304. In embodiments, machine learning pipeline 306 includes a content score generator 308, which includes a user score generator 310 and a title score generator 312. Runtime engine 324 includes a content recommendation generator 325 and a content recommendation score ranker 326. As shown in FIG. 3, storage 112 includes event catalog 114, feature catalog 116, and scores 118 as described above with reference to FIG. 1. In example embodiments, scores 118 include user scores 318 and title scores 320.

Flowchart 200 of FIG. 2 begins with step 202. In step 202, user event records associated with a plurality of media items and a plurality of content types are stored. For instance, with reference to FIG. 3, event cataloger 301 is configured to obtain user event records 128 associated with a plurality of media items (e.g., video games) and a plurality of content types, from computing devices and/or servers where such events are performed, and to store such user event records 128 in event catalog 114. Event catalog 114 may thereby comprise one or more logs corresponding to user event records associating user records across a plurality of media items and content types based on actions performed on computing device(s) 102. Event catalog 114 may include, for instance, historical data for each of a plurality of users of computing device(s) 102. Each user event record 128 may include any action performed by a user on computing device(s) 102, including but not limited to viewing or accessing certain types of content, such as accessing a screenshot, a game broadcast, a community manager or message board post, playing a video game, etc. Each user event record 128 may also include a time associated with a performed action (e.g., a start time, an end time, a duration), one or more navigation actions performed on a graphical user interface of computing device (e.g., interface elements with which a user interacted, menus or pages that were accessed), etc. In example embodiments, event catalog 114 may log data in any manner, including using any suitable data structure (e.g., a database, spreadsheet, etc.). Event catalog 114 may also be configured to log user event records 128 in a raw or unaggregated manner, or compile or aggregate logged event records. In some implementations, event cataloger 301 may obtain user event records 128 from computing device(s) 102 after each user action is performed, or may obtain user event records 128 after a threshold number of events or a threshold time has been exceeded (e.g., once per hour, once per day, etc.).

Feature categorization pipeline 302 may obtain, from event catalog 114, user event records 128 corresponding to the logged user actions. Feature categorization pipeline 302 is configured to generate machine-learning based features 314 based on user event records 128 in event catalog 114. Feature categorization pipeline 302 may generate and store such features 314 in feature catalog 116 as shown in FIG. 3.

Feature categorization pipeline 302 may generate features 314 based on user event records 128 in event catalog 114 in a number of ways. In example embodiments, feature aggregator 304 may generate features 314 based on an aggregation of user event records. In some implementations, feature aggregator 304 may generate features 314 based on a particular user's logged event records. For instance, where event catalog 114 contains a log of each session in which a user played a multiplayer game across a plurality of different game titles (e.g., by logging a start time, end time, duration, the identification of the content type, and/or the game title), feature aggregator 304 may aggregate the user event records to generate features corresponding to a duration that the particular user played a multiplayer game in a predetermined time period. As an illustrative example, feature aggregator 304 may generate features corresponding to the number of hours a user played multiplayer games in the past 7 days, 30 days, 90 days, etc. In another illustrative example, feature aggregator 304 may implement one or more time offsets when aggregating information contained within or derived from user event records 128. For instance, a time offset may enable feature aggregator 304 to aggregate information over a particular period of time, such as particular day(s), week(s), month(s), etc. or using a rolling time window. For example, information may be aggregated over a first week using no offset (e.g., days 1 to 7), a second week using a 7-day offset (e.g., days 8 to 14), and so on. Such aggregation is not limited to aggregating a duration for a particular type of game played, but may include any other type of aggregation, statistical analyses, and/or processing of data contained within event catalog 114 for one or more content types.

For instance, features 314 may also include features relating to user profile characteristics (age group, region, account creation date), gameplay behavior (gamer score, gamer score during one or more prior time intervals, number of hours online hours, number of gameplay hours, interaction (e.g., likes or dislikes), number of clips shared or accessed, social behavior (number of followers, number of subscribers, etc.), or any other feature (or aggregation of features) that may be derived from user event records 128. Furthermore, although features 314 may be generated in connection with one or more time intervals, features 314 may also be generated based on a time of day, day of the week, etc. By generating features 314 across a large variety of characteristics and over various times and time periods, both short term and long term behavioral habits associating a user and title affinity with certain content types may be inferred.

In some other implementations, feature aggregator 304 may aggregate data across a plurality of users (e.g., all users of computing device(s) 102) for a particular title. For instance, feature aggregator 304 may aggregate data contained within event catalog 114 to generate features corresponding to a duration that each of a plurality of content types for a particular title was accessed over one or more time periods (e.g., 7 days, 30 days, 90 days, etc.). Thus, in implementations, feature aggregator 304 may generate features 314 based on an aggregation of data corresponding to a particular user's access of content types across a plurality of game titles (e.g., irrespective of the game title), as well as features based on an aggregation of data corresponding to content types accessed for a particular game across a plurality of users (e.g., irrespective of the user).

As described earlier, features 314 aggregated by feature aggregator 304 may be stored in feature catalog 116. In some example embodiments, feature aggregator 304 may be configured to aggregate features in event catalog 114 at predetermined time intervals. Feature aggregator 304 may execute once per hour, once per day, etc., or any other time interval identified by an administrator or manager of recommender system 108.

In embodiments, feature aggregator 304 may aggregate data contained within event catalog in a number of ways. For instance, feature aggregator 304 may utilize one or more feature aggregation scripts that identify how such data should be aggregated to generate features. Each feature aggregation script may be written manually (e.g., by a developer, administrator, etc.) or may be automatically generated based on a user interaction with a feature aggregator configuration tool (not shown). For instance, a developer may identify a plurality of attributes or parameters using the feature aggregator configuration tool (e.g., a location and/or type of the raw, unaggregated user events, an aggregation duration, a content type, etc.). Based on the developer input, the feature aggregator configuration tool may automatically generate a script (e.g., a code) that feature aggregator 304 may utilize to generate one or more features.

In step 204, a set of user scores for a user based on a user-content score model and the user event records is generated. For instance, with reference to FIG. 3, user score generator 310 may generate a set of user scores based on a user-content score model and user event records 128. In implementations, the user-content score model may comprise an algorithm (e.g., a sum or other combination of a series of variables that optionally each have coefficients) or a machine-learning based model that may output a set of user scores based on features 314, raw or unaggregated data user event records 128 contained within event catalog 114, or any combination thereof. Based on user event records 128 and/or features 314 derived from user event records 128, user score generator 310 may be configured to generate, for a particular user, a set of user scores corresponding to each of a plurality of content types. In example embodiments, each generated user score generated by user score generator 310 may indicate an affinity between a particular user and a corresponding content type of the plurality of content types. For instance, a score for a content type (e.g., achievements, screenshots, joining a multiplayer game, etc.) may represent the particular user's affinity to access the content type across a plurality of games. In an illustrative example, if event catalog 114 comprises logged user event records indicating that a user predominantly views live broadcasts of games more often than the user accesses any other content type, user score generator 310 may generate a user score corresponding to live broadcasts that may be higher relative to other content type scores for that user. In implementations, user score generator 310 may generate a plurality of user scores corresponding to each content type. In this manner, a set of user scores for a particular user may be generated that comprises a score for each content type, the generated score indicating an affinity between the user and the corresponding content type.

In some implementations, as described above, the user-content score model may comprise a machine-learning based model based on one or more machine-learning based features 314 (e.g., from feature catalog 116). User score generator 310 may apply the user-content score model using a machine-learning based algorithm to identity and/or determine one or more clusters, patterns, etc., to generate a set of user scores for a particular user. For instance, the user-content score model may be configured to analyze patterns based on user behaviors (e.g., which types of a content a user is likely to access) and generate user scores based on such behaviors. Machine-learning based model may implement one or more unsupervised approaches, including collaborative filtering and/or content based recommendations to predict how likely a user may interact with certain content types despite no prior interaction by the user. In other instances, machine-learning based model may also be trained based on a supervised approach to predict how likely a user may interact with a type of content based on a variety of learned behavioral patterns at a certain time (e.g., a certain day) or over a particular period of time.

In other implementations, the user-content score model may comprise a heuristics model configured to analyze a frequency of event records from event logger 114. For instance, a heuristics model may analyze a number of times a user accessed a particular type of content in a given time period (e.g., in the past day, week, month, etc.). For instance, if a particular user accessed a first content type (e.g., screenshots) for one hour, and another content type (e.g., joining a multiplayer game) for another hour in a particular time period (e.g., the past day), a heuristics model may determine that the user scores may assign 0.5 to the first and second content types, while assigning a lower score (e.g., zero) to the remaining content types for the given time period. The heuristics model may be configured to perform such an analysis on a plurality of different time periods to generate an aggregated frequency mapping of a particular user's interaction with each of a plurality of content types. In implementations, an exponential decay (or other weighting factor) may also be applied to user interactions, such that a user's more recent interactions are assigned higher scores than the user's older interactions with the plurality of content types. In this manner, user score generator 310 may generate a set of user scores for a particular user's affinity for accessing a plurality of content types.

In some implementations, a user interface may be implemented that enables one or more attributes of user score generator 310 to be configured. For instance, a user interface may enable the types of content for which a score is to be determined, may assign time durations for which a user's propensity to a particular content type are analyzed, may assign a weighting factor or exponential decay for any one or more content types, or any enable any other configuration of the manner in which user score generator 310 generates a set of user scores for a given user.

In embodiments, user scores generated by user score generator 310 may also be normalized. For instance, normalizer 316 may be configured to scale one or more generated user scores. In some other implementations, normalizer 316 may be configured to normalize user scores such that each of the generated scores are between a minimum value and a maximum value (e.g., between 0 and 1). Normalizer 316 may also be configured to apply a certain minimum score for one or more content types. For example, a minimum floor value and/or maximum ceiling value may be applied in order to increase or decrease the likelihood that a particular content type is included in content recommendations 126. As a result, certain scores may be elevated (e.g., in the event a new content type is developed or added) or reduced (e.g., in the event where certain content types should be limited).

It is understood and appreciated that normalizer 316 may implement any normalization technique known by those skilled in the relevant art(s) to normalize scores 334 obtained from content score generator 308. For instance, normalizer 316 may normalize user scores to a common scale (e.g., between 0 and 1) using any suitable normalization formula (e.g., standard score, feature scaling, etc.). In implementations, normalizer 316 may store normalized user scores 318 in storage 112, as shown in FIG. 3. In implementations, however, normalizer 316 is optional, and therefore user scores 318 may comprise non-normalized scores generated by content score generator 308.

In step 206, a set of title scores for a media item is generated based on a title-content score model and the user event records. For instance, with reference to FIG. 3, title score generator 312 may apply a title-content score model to generate a set of title scores. In implementations, each title score generated by title score generator 312 may indicate an affinity between the media item and a corresponding content type of the plurality of content types. In other words, each title score may represent the relative likelihood of interaction of each of a plurality of content types in connection with a particular media item (e.g., a video game). In implementations, title score generator 312 may generate title scores corresponding to the same content types generated by user score generator 310. For example, if user score generator 310 generates user scores for each of 20 different content types, title score generator 312 may be configured to generate title scores for the same 20 different content types. In this manner, title scores may be generated based on behavioral patterns across a relatively large population, rather than a particular user's propensity for accessing certain content types. In a non-limiting example, title score generator 312 may generate title scores that indicate, for a particular game, that users are most likely to engage in multiplayer gameplay (e.g., by assigning a relatively high score), while users are not likely to read community postings about the game (e.g., by assigning a relatively low score).

In example embodiments, title score generator 312 may generate title scores that indicate an affinity between the media item and a corresponding content type of a plurality of content types in various ways. For instance, title score generator 312 may generate such title scores in a similar manner as described above with respect to the generation of user scores, including but not limited to using a title-content score model that is an algorithm, a machine-learning based model, a heuristics model, or a combination thereof. Normalizer 316 may also normalize title scores to generate and store normalized title scores 320, in a similar manner as described above. In this manner, a set of title scores 320 may be generated for each of a plurality of content types for a particular media item across a larger population (e.g., all users of computing device(s) 102), thereby enabling recommender system 108 to utilize not only behavioral patterns associated with a particular user (via user scores 318), but also behavioral patterns associated with the general population for a given game (via title scores 320).

In some other implementations, content score generator 308 may generate user scores and/or title scores based on a combination of a machine-learning based model and a heuristics model. For instance, content score generator 308 may generate user scores and/or title scores for certain content types using a machine-learning based model and generate user scores or title scores for other types of content types using a heuristics model. In yet another implementation, content score generator 308 may generate scores by combining scores generated by both models.

It is noted that although user scores and title scores may be generated using a machine-learning based model and/or heuristics model described herein, such implementations are illustrative only. Example embodiments may comprise generating user scores associating a user's propensity to access a plurality of content types and title scores associating a particular game with a plurality of content types in any other suitable manner or using any other type of algorithm/model.

In implementations, content score generator 308 may generate user scores and title scores periodically, e.g., every hour, day, or upon an occurrence of another event, such as execution of feature aggregator 304. In this manner, user scores 318 and title scores 320 may be continuously updated based on user event records stored by event catalog 114 and/or features 314.

Accordingly, in example embodiments, content score generator 308 may be configured to generate two separate sets of scores for a plurality of content types. As described above, user scores 318 may represent a particular user's propensity to access each of a plurality of content types, while title scores 320 may represent the propensity that users of a particular video game will access each of the plurality of content types associated with that game.

In step 208, a set of content recommendations based on combinations of the user scores and title scores are provided. For example, with reference to FIG. 3, score publishing pipeline 322 is configured to obtain user scores 318 and title scores 320 from storage 112. In response to request 124 for a content recommendation from a requestor (e.g., one of computing device(s) 102), runtime engine 324 may obtain scores 336 from publishing pipeline 322 to generate and provide a set of content recommendations 126. Operation of score publishing pipeline 322 and runtime engine 324 are described in more detail as follows.

Publishing pipeline 322 may comprise a data cache, object store, or other similar memory or storage configured to obtain and store the most recently generated sets of user scores 318 and title scores 320. As such scores are continuously updated based on a number of factors (e.g., constantly changing user event records and/or features), updated scores may be continuously provided to publishing pipeline 322 such that runtime engine 324 may access the most recent set of scores. Accordingly, publishing pipeline 322 may obtain user scores 318 and title scores 320 at predetermined intervals as described above (e.g., daily). In some implementations, publishing pipeline 322 may obtain user scores 318 and title scores 320 at different time intervals. For example, because an individual user's habits may not change as often, user scores 318 may be generated at one interval (e.g., daily or weekly). On the other hand, as title scores 320 take into account the behavior of a larger population, such scores may change more often (e.g., where a certain type of content for a particular video game is trending across many users) and therefore may be generated more frequently (e.g., hourly or daily). In such a scenario, publishing pipeline 322 may therefore obtain scores at different times.

In some implementations, publishing pipeline 322 may also obtain near real-time signals 330, comprising for example, time sensitive content that may be relevant to a user when the content is new or relatively recent. Based on such near real-time signals 330, publishing pipeline 322 may modify one or more title scores. Example embodiments implementing a modification to a title score based on near real-time signals is described in greater detail below with reference to FIG. 5.

Runtime engine 324 may operate in various ways to provide content recommendations 126 based on user scores 318 and title scores 320. Based on scores 336 comprising the user scores, title scores, and/or revised title scores, content recommendation score ranker 326 of runtime engine 324 may be configured to generate a combined set of scores based on combinations of the obtained scores.

In some examples, content recommendation score ranker 326 may combine scores 336 in real-time in response to receiving a content recommendation request using one or more linear interpolation techniques. For instance, real-time linear interpolation may be utilized to generate a combined score, for each content type, at a value between the corresponding user score and title score for that content type. In another example, linear interpolation of scores 336 may further implement a biasing factor in generating a combined set of scores. For instance, the biasing factor may be configured to scale one or more individual content type scores toward the generated user score or the generated title score. In other instances, the biasing factor may be configured to bias an entire set of scores (e.g., the user scores), such that the user scores are weighted heavier than the title scores during generation of the combined scores. As one illustrative example, because it may be inferred that experienced users of computing device(s) 102 may prefer content recommendations based more heavily on personalized historical behavior (e.g., user scores), content recommendation score ranker 326 may implement a biasing factor enabling the user scores associated with the particular user to have a heavier weight. In other instances, such as where a user is relatively new, behavior patterns across the general population (e.g., using title scores) may be weighted stronger. In yet another example, where event catalog 114 comprises insufficient data for a given title (such as where a title is newly released), biasing factor may result in user scores being weighted stronger.

Biasing factors corresponding to the one or more content types may be predetermined or programmed by an administrator of content recommendation score ranker 326. In other instances, the biasing factors may be dynamic, or configurable by an administrator or a user of one computing device(s) 102 or recommender system 108 via a suitable interface. In yet other implementations, content score generator 308, based on a user-content score model or title-content score model, may determine one or more biasing factors using a suitable machine-learning technique. In such an implementation, publishing pipeline 322 may obtain such machine-learning based biasing factors and provide the biasing factors to content recommendation score ranker 326 for generation of the combined scores. In examples, therefore, content recommendation score ranker 326 may apply a biasing factor for one or more content types depending on the particular circumstances, such that content recommendation generator 325 may generate an appropriate content recommendation. As an illustrative example, therefore, the combined score for a particular content type [i], may be represented as follows:

CombinedScore [$i$]=LinearInterpolation (UserScore [$i$], TitleScore[$i$], Bias[$i$]), where CombinedScore[i] represents the combined score for a particular content type [i], LinearInterpolation represents a linear interpolation technique, UserScore[i] represents a user score for the particular content type [i], TitleScore[i] represents the title score for the particular content type [i], and Bias[i] represents the bias for the content type [i].

In some other examples, certain content types may not be relevant for a particular game. For instance, because a single player game may not have any multi-player functionality, content recommendation score ranker 326 need not generate a combined score corresponding to the multiplayer gameplay content type. In such examples, content recommendation score ranker 326 may implement a filter (e.g., a high-pass filter or the like) to filter out content types for games that are not relevant. In an implementation, the high-pass filter may comprise a multiplier of 1 for each content type that is available for a game, and 0 for content types that are not available for the game. With respect to some other content types, such as a "friend finder" content type, a filter may filter out such content types where a particular user has not authorized access to a listing of the user's friends (e.g., via a social media platform interface) or otherwise opted out of interacting with certain content types. In each such implementation, therefore, the combined score for a particular content type [i], may be represented as follows:

CombinedScore [i]=LinearInterpolation (UserScore [i], TitleScore[i], Bias[i])*HighPassFilter (TitleScore[i]), where HighPassFilter represents a filter for filtering out content types that are not relevant for a particular title or for which a user has opted out.

It is noted that although example implementations are described herein using an illustrative high pass filter, implementations are not so limited. For instance, the calculation of a combined score for a given content type may be carried out in any other suitable manner. In an example, combined scores may be computed from user scores 318 and title scores 320, where title scores 320 are used as a discrete high-pass filter. Thus, where user scores 318 and title scores 320 are normalized (e.g., comprise values between 0 and 1), the combined score for a particular content type [i], may be represented as follows:

CombinedScore[i]=UserScore[i]+Bias[i]*(TitleScore [i]−UserScore[i]), where the corresponding TitleScore comprises a value greater than 0.0, and CombinedScore[i]=0, where the corresponding TitleScore is 0.0.

In yet other implementations, the combined score for a particular content type [i], may be represented as follows:

CombinedScore[i]=(UserScore[i]+Bias[i]*(TitleScore [i]−UserScore[i])*Ceiling(TitleScore[i]), where Ceiling(TitleScore[i]) represents a function configured to round a title score value for a particular content type [i] up to the next integer value (e.g., a TitleScore[i] value of 0.3 will round up to 1.0).

In some other examples, other rounding functions may also be implemented, such as a Floor(TitleScore[i]) function configured to round a title score value for a particular content type [i] down to the next integer value (e.g., a TitleScore[i] value of 0.3 will round down to 0.0). In yet other examples, any other rounding functions may be implemented, such as rounding functions configured to round a particular value up or down to the closest integer. While illustrative techniques for calculating a combined score are described, it is understood and appreciated that other techniques may be implemented for combining user scores 318, title scores 320, biasing factors, and/or any other factors or signals described herein.

In yet other implementations, content recommendation score ranker 326 may utilize real-time signals 332 in generating a set of content recommendations 126. Real-time signals 332 may indicate, for instance, information regarding time-sensitive content for a particular title, such as whether one or more content types are currently available or active. As is described in greater detail below, runtime engine 324 may utilize such real-time signals 332 during the generation of the combined scores.

In other example embodiments, content recommendation score ranker 326 may implement one or more editorial or administrator overrides enabling certain content types to have increased or decreased scores. For example, such overrides may enable content recommendation score ranker 326 to decrease a score associated with a content type such that the particular content type does not predominate other content types. In other examples, overrides may enable certain other content types to comprise a minimum combined score such that the content type is provided at least a minimum percentage of times within the set of content recommendations 126. In this way, the discoverability of certain types of content may be increased, enabling users to engage in content that such users may not interact with absent a recommendation. In other instances, discoverability of other types of content may be decreased to avoid repetition of content recommendations and/or enable a user to engage with other content types. Accordingly, certain content types may be elevated and/or reduced based on an editorial or administrator's configuration.

Because publishing pipeline 322 is configured to continuously receive updated user scores 318 and title scores 320, in addition to near real-time signals 330, content recommendation score ranker 326 may combine scores 336 (e.g., mathematically or using any other technique) in real-time in response to receiving request 124. As a result, content recommendation score ranker 326 may generate a combined set of scores along with any biasing factors or filters, thus enabling computing device(s) 102 to receive a set of content recommendations 126 with minimal delay or latency. Furthermore, such quick decision-making capabilities enables the selection of content to recommend in high performance synchronous scenarios, while also minimizing a footprint in multi-tier asynchronous integrations.

As described above, normalizer 316 may be configured to normalize user scores 318 and/or title scores 320 prior to publishing pipeline obtaining such scores. In such a scenario, therefore, content recommendation score ranker 326 may generate a combined set of scores as described herein based on normalize user scores 318 and/or normalized title scores 320. In other examples, content recommendation score ranker 326 may be configured to apply normalizer 316 to normalize a combined set of scores (e.g., after applying a linear interpolation technique or other technique for combining scores 336).

Content recommendation generator 325 may utilize the combined scores to determine which specific items of content to include in the set of content recommendations 126 in response to request 124. Accordingly, by combining user scores 318, title scores 320, near real-time signals 330, real-time signals 332, and/or one or more biasing factors as described herein, runtime engine 324 may generate a set of content recommendations 126 that balances a particular user's preferences, popularity of content types for a particular title across a plurality of users, the availability of such content, and any content score modifiers. In this manner, runtime engine 324 may generate combined scores such that content relevant to both the user and the title may comprise relatively higher scores. Furthermore, content that is popular for a particular title may comprise elevated scores, while taking into account user preferences for such content. In other examples, content that may not exist for a title or may not be presently relevant to a user may be filtered out as described herein. As a result, runtime engine 324 is enabled to provide a set of content recommendations 126 that is appropriate to a user based on the particular circumstances, thereby increasing the likelihood that the user accesses such content and increasing the overall user experience.

Figure 4:
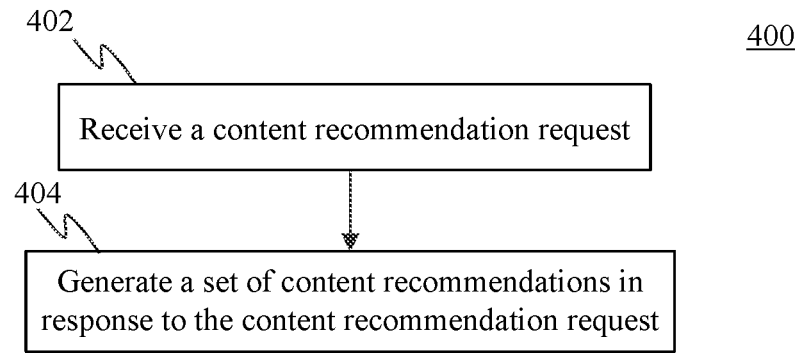
FIG. 4 shows a flowchart for generating a set of content recommendations, according to an example embodiment.

In implementations, runtime engine 324 may generate content recommendations 126 in various ways. For example, FIG. 4 shows a flowchart 400 of a method for generating a set of content recommendations, according to an example embodiment. In an implementation, the method of flowchart 400 may be implemented by content runtime engine 324. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a content recommendation request is received from a requestor. For instance, with reference to FIG. 3, runtime engine 324 may receive request 124 corresponding to a content recommendation request from a requestor, such as one of computing device(s) 102. Request 124 may be transmitted by computing device(s) 102 in various ways. For instance, request 124 may be transmitted in response to a request for recommended content initiated by a user of one of computing device(s) 102 via interaction with an interactive interface control. In another implementation, request 124 may be transmitted based on a user navigation within one or more graphical user interface (GUI) screens. In some examples, request 124 may be generated based on a user navigation to a home screen, a menu screen, a guide screen, a game hub (e.g., a page dedicated to a particular title), an attract mode screen (e.g., a screen displayed during an idle or time-out state of one of computing devices 102 that may comprise content recommendations 126), or a content store interface where content may be accessed, purchased, downloaded, etc. Based on such a user navigation to one or more appropriate interface screens, computing device 102 may automatically generate and transmit request 124 to runtime engine 324 to obtain content recommendations 126 for real-time presentation on such screens. In a non-limiting example, request 124 generated based on an attract mode screen may include a content recommendation request for content to be displayed on an idle screen that is relevant for a particular user in order to cause the user to resume interaction with the computing device and/or recommended content on the device.

In some implementations, different GUI screens may be configured to present different content types. As an example, a content store interface may present content types associated with items available for purchase or download, but may not present other types of content (e.g., live broadcasts). Accordingly, request 124 may be configured to include an identification of the graphical user interface screen on which content recommendations 126 are to be presented such that content types not eligible for presenting are not included within content recommendations 126. In another example, request 124 may comprise an identification of the user of computing device 102, such that runtime engine 324 may return an appropriate content recommendation. In yet another example, request 124 may comprise an identification of the title for which content recommendations 126 are to be presented (e.g., where a user navigates to a game hub screen), such that content recommendations 126 may comprise recommendations associated with that title. In some other implementations, a GUI screen may not be associated with a particular title (e.g., a home or startup screen). In such instances, content recommendation generator 325 may generate content recommendations 126 based on user scores 318 (i.e., without title scores 320).

In step 402, a set of content recommendations is generated in response to the content recommendation request. For instance, with reference to FIG. 3, content recommendation generator 325 of runtime engine 324 may generate a set of content recommendations 126 in response to request 124. Content recommendation generator 325 may generate content recommendations 126 as described above, e.g., with reference to flowchart 200. For example, based on request 124, along with any other identifiers identifying the user, GUI screen, etc., content recommendation generator 325 may generate an appropriate set of content recommendations 126 to provide to the requestor associated with request 124.

As an illustrative, non-limiting example, where a user navigates to a game hub screen for a particular title, content recommendation score ranker 326 may combine scores 336 in a similar manner as described herein (e.g., via a linear interpolation technique), along with other modifying factors, such as biasing factors, real-time signals 332 and/or or other filters to filter out ineligible content. Based on the combined scores, content recommendation score ranker 326 may rank the combined scores. In examples, content recommendation score ranker 326 may sort the content types according to combined scores, such that content types with higher scores may appear higher in the ranking.

Using the ranked scores, content recommendation generator 325 may thereby generate one or more appropriate content types for the particular title by providing a ranked listing of content recommendations 126 to the requestor. In some implementations, content recommendations 126 may recommend content which rank above a threshold amount, or may provide content recommendations 126 based on the highest several ranked content types. For instance, content recommendation generator 325 may determine that for a particular user and title, screenshots and live broadcasts are the most appropriate content to recommend. Accordingly, content recommendation generator 325 may identify one or more screenshots and/or live broadcasts corresponding to the title to include in content recommendations 126.

In some instances, content recommendations 126 may include an identifier, such as a uniform resource locator (URL) or other interactive link, pointer, or identifier from which the content may be accessed upon a user interaction. In other examples, computing device 102 may populate the appropriate GUI screen based on received content recommendations 126. For instance, computing device(s) 102 may be configured to obtain real-time content corresponding to recommended content types received from runtime engine 324. As a result, even if runtime engine 324 recommends the same content types for a particular user, the underlying content obtained by computing device(s) 102 corresponding to the recommended content types may be different based on the actual content currently available. Computing device 102 may enable a user to interact with one or more of the presented content recommendations by clicking or otherwise displayed content.

Figure 5:
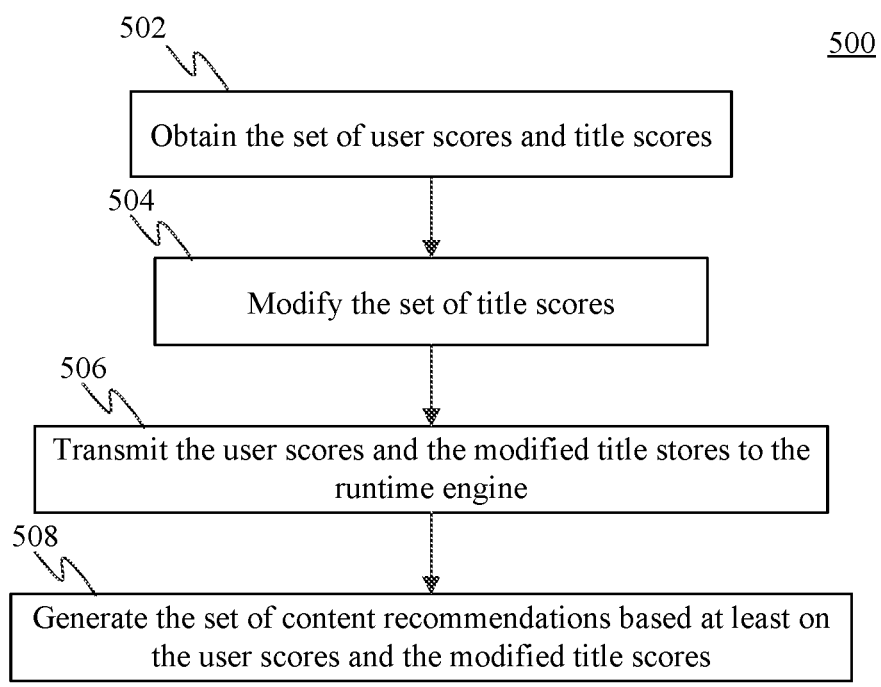
FIG. 5 shows a flowchart for providing a set of content recommendations based on user scores and modified title scores, according to an example embodiment.

As described above, in implementations, title scores 320 may be modified based on near real-time signals 330 in various ways. For example, FIG. 5 shows a flowchart 500 of a method for providing a set of content recommendations based on user scores and modified title scores, according to an example embodiment. In an implementation, the method of flowchart 500 may be implemented by publishing pipeline 322 and runtime engine 324. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, the set of user scores and title scores are obtained. For instance, with respect to FIG. 3, score publishing pipeline 322 may obtain user scores 318 and title scores 320 from storage 112 as described above. In examples, scores 318 and title scores 320 may include the most recent set of scores generated by content score generator 308, which may be generated hourly, daily, weekly, or at any other time interval.

In step 504, the set of title scores is modified. For instance, with continued reference to FIG. 3, title scores 320 may be modified based on information contained within near real-time signals 330 obtained by publishing pipeline 322. Near real-time signals 330 may comprise, for instance, time sensitive content such as content that may be relevant to a user when the content is new or relatively recent. In some example embodiments, near real-time signals 330 may include recent content corresponding to a media item, such as content that was derived since the most recent set of title scores 320 were generated, or content generated for a particular title that is otherwise not included during the generation of title scores 320.

In other example implementations, near real-time signals 330 may include postings corresponding to a video game, such as a community manager posting or a message board posting relating to a message, screenshot, game clip, or other content associated with a particular title. A community manager posting may comprise, for instance, a posting or message from one of content publishing devices 120. For example, an administrator, manager (e.g., a community manager representing certain titles for a given region or language), publisher, and/or game user may generate postings related to a media item, such as a game update, news about a game, or the like. Publishing pipeline 322 may be configured to continuously or periodically (e.g., every minute, 10 minutes, hourly, etc.) monitor such postings based on information contained within event catalog 114 via a suitable workflow and determine whether one or more title scores 320 corresponding to the video game should be altered. Publishing pipeline 322 may monitor for the presence of such posts by determining whether new event records exist within event catalog 114 corresponding to an identifier associated with each title (e.g., a TitleID).

In example embodiments, if a community manager posted about a particular game (or other recent content is located based on near real-time signals 330), publishing pipeline 322 may elevate a corresponding title score. In another example, publishing pipeline 322 may elevate a plurality of scores depending on the content types discussed in the posting. For instance, if the posting related to both screenshots and multiplayer gameplay, publishing pipeline 322 may revise the set of title scores 320 to elevate the community manager posting score, screenshot score, and multiplayer gameplay score and/or decrease one or more other scores within the set. In yet another example, publishing pipeline 322 may elevate all scores within the set of title scores for a given game in response to determining that a recent community manager posting was generated, thus increasing the likelihood of content from the game being included in the set of content recommendations 126.

In some example embodiments, publishing pipeline 322 may revise title scores 322 depending on the age of the community manager posting. For instance, older posting may be deemed less relevant, while newer postings are more relevant. As a result, publishing pipeline 322 may increase one or more title scores 320 by a larger value for such recent postings compared to older postings. In some implementations, publishing pipeline 322 may determine that a posting exceeding a threshold age (e.g., community manager postings older than 7 days) should not be used to modify any of title scores 320. The amount that a particular score is increased or decreased may be a fixed amount or a variable amount (e.g., based on an age), or may be based on a multiplier or other similar weighting factor.

As a non-limiting example, content score generator 308 may determine that the title score corresponding to a content type (e.g., community manager posting) for a particular game may be zero where the most community manager posting is 10 days old. Accordingly, publishing pipeline 322 may obtain title scores 320 comprising such the corresponding score of zero for the community manager posting content type. However, if a community manager recently (e.g., within the last hour) generated a posting about the same title, publishing pipeline 322 may determine that the set of title scores 320 obtained by publishing pipeline 322 should be elevated in response to the recent posting. In this manner, even though publishing pipeline 322 may obtain user scores 318 and title scores 320 at predetermined intervals (e.g., daily, weekly, etc.), such scores may be revised based on near real-time signals 330 that publishing pipeline 322 obtains more frequently.

In some implementations, rather than regenerating an entire set of title scores 320 based on near real-time signals, publishing pipeline 322 may be configured to identify only the scores which should be modified, and modify only such scores. By modifying title scores based on a delta function or similar function, a revised set of title scores may be generated more efficiently, thus further reducing the required processor resources.

Accordingly, publishing pipeline 322 may continuously store sets of user scores 318 and revised title scores based on recent information, enabling runtime engine 324 to generate content recommendations 126 quickly (e.g., via a mathematical combination of such scores) while still using up-to-date scores.

In step 506, the user scores and the modified title scores are transmitted to the runtime engine. For instance, with reference to FIG. 3, score publisher 322 may transmit scores 336 comprising user scores 318 and a modified set of title scores as described herein to runtime engine 324 in a similar manner as described above.

In step 508, the set of content recommendations is generated based on at least one of the user scores and the modified title scores. For instance, with continued reference to FIG. 3, runtime engine 324 is configured to generate and provide the set of content recommendations 126 to the requestor (e.g., one of computing device(s) 102 associated with request 124) based on scores 336 comprising user scores 318 and a modified set of title scores. Step 508 may be carried out in a manner similar as described above with respect to step 208 of FIG. 2, using the modified title scores as described herein instead of title scores 320 obtained by publishing pipeline 322. In this manner, because the modified title scores comprise title scores updated at a more frequent interval than title scores 320, runtime engine 324 is enabled to provide content recommendations 126 taking into account time sensitive content that may not have existed at the time title scores 320 were generated. As a result, content recommendations 126 comprise up-to-date content recommendations, thereby increasing the likelihood of interaction with such recommended content and enhancing the user experience.

Figure 6:
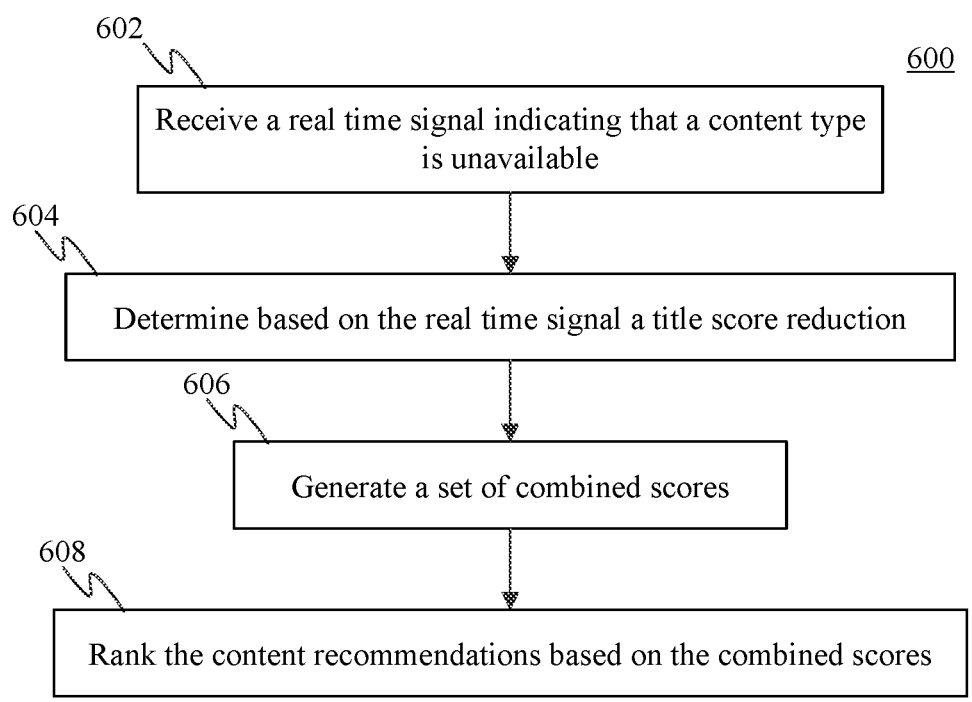
FIG. 6 shows a flowchart for ranking content recommendations based on a real-time signal, according to an example embodiment.

In implementations, runtime engine 324 may rank recommendations in various ways. For example, FIG. 6 shows a flowchart 600 of a method for ranking content recommendations based on a real-time signal, according to an example embodiment. In an implementation, the method of flowchart 600 may be implemented by content runtime engine 324. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a real-time signal indicating that a content type is unavailable is received. For instance, with reference to FIG. 3, content recommendation score ranker 326 may receive real-time signals 332 indicating that one or more content types for a particular title is presently unavailable. Real-time signals 332 may comprise information regarding time-sensitive content for a particular title, such as whether one or more content types are currently unavailable. In some examples, real-time signals 332 may indicate whether one or more content types corresponding to a particular game is presently available or active at the time runtime engine 324 receives request 124. For instance, if a particular game was capable of providing live broadcasts, but no such broadcasts were available at the time request 124 is made (e.g., no user is currently playing the game), real-time signals 332 may indicate that such content types are not currently available. Real-time signals 332 may be obtained in a plurality of ways, including but not limited to a call context, one or more beacons, and/or polling techniques. In some other instances, content recommendation score ranker 326 may also receive one or more near real-time signals in addition to, or as an alternative to real-time signals 332. For example, near real-time signals may include near real-time signals 330 discussed with reference to FIG. 5, or may include other types of signals relating to available content at an interval quicker than scores 318 and/or title scores 320 are generated. In one illustration, near real-time signals may be obtained by reading a stream of data in a batch mode at a relatively frequent basis (e.g., hourly), while scores 318 and/or title scores 320 may be generated daily.

In step 604, based on the real-time signal, a title score reduction is determined. For instance, with reference to FIG. 3, content recommendation score ranker 326 may determine, based on real-time signals 332 or near real-time signals, that one or more title scores associated with a particular title should be reduced. In some implementations, content recommendation score ranker 326 may determine a reduction to make to the one or more title scores. A title reduction based on real-time signals 332 or near real-time signals may be carried out in various ways. For instance, content recommendation score ranker 326 may implement a filter to zero out the combined score corresponding to the content type(s) for which real-time signals 332 or near real-time signals identified as being currently unavailable. In this way, runtime engine 324 may not include the particular content type in the set of content recommendations 126 where such content is not presently active due to the reduction (e.g., a filter as described herein).

In step 606, a set of combined scores is generated. For example, with continued reference to FIG. 3, content recommendation score ranker 326 may generate a set of combined scores. In implementations, the combined score may be based, for instance, on scores 336 comprising user scores 318, title scores 320 or (or a revised version of title scores 320 based on near real-time signals 330), one or more biasing factors, and/or a reduction based on real-time signals 332 or near real-time signals. In such example embodiments, therefore, the combined score for a particular content type [i], may be represented as follows:

CombinedScore [$i$]=LinearInterpolation (UserScore [$i$], TitleScore[$i$], Bias[$i$])*HighPassFilter (TitleScore[$i$])*Filter (RealTimeSignal[$i$]), where Filter represents a filter for reducing or filtering out content types that are not presently available or active, and RealTimeSignal[i] represents a real-time signal or non-real time signal indicating whether a particular content type [i] is presently available or active.

In step 608, the content recommendations are ranked based on the combined scores. For example, with reference to FIG. 3, content recommendation score ranker 326 may be configured to rank the combined scores. Step 608 of FIG. 5 may be carried out, for instance, in a similar manner as described above.

III. Example Mobile and Stationary Device Embodiments

Computing device(s) 102, server 106, recommender system 108, storage 112, content publishing devices 120, flowchart 200, flowchart 400, flowchart 500, and/or flowchart 600 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of computing device(s) 102, server 106, recommender system 108, storage 112, content publishing devices 120, flowchart 200, flowchart 400, flowchart 500, and/or flowchart 600 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
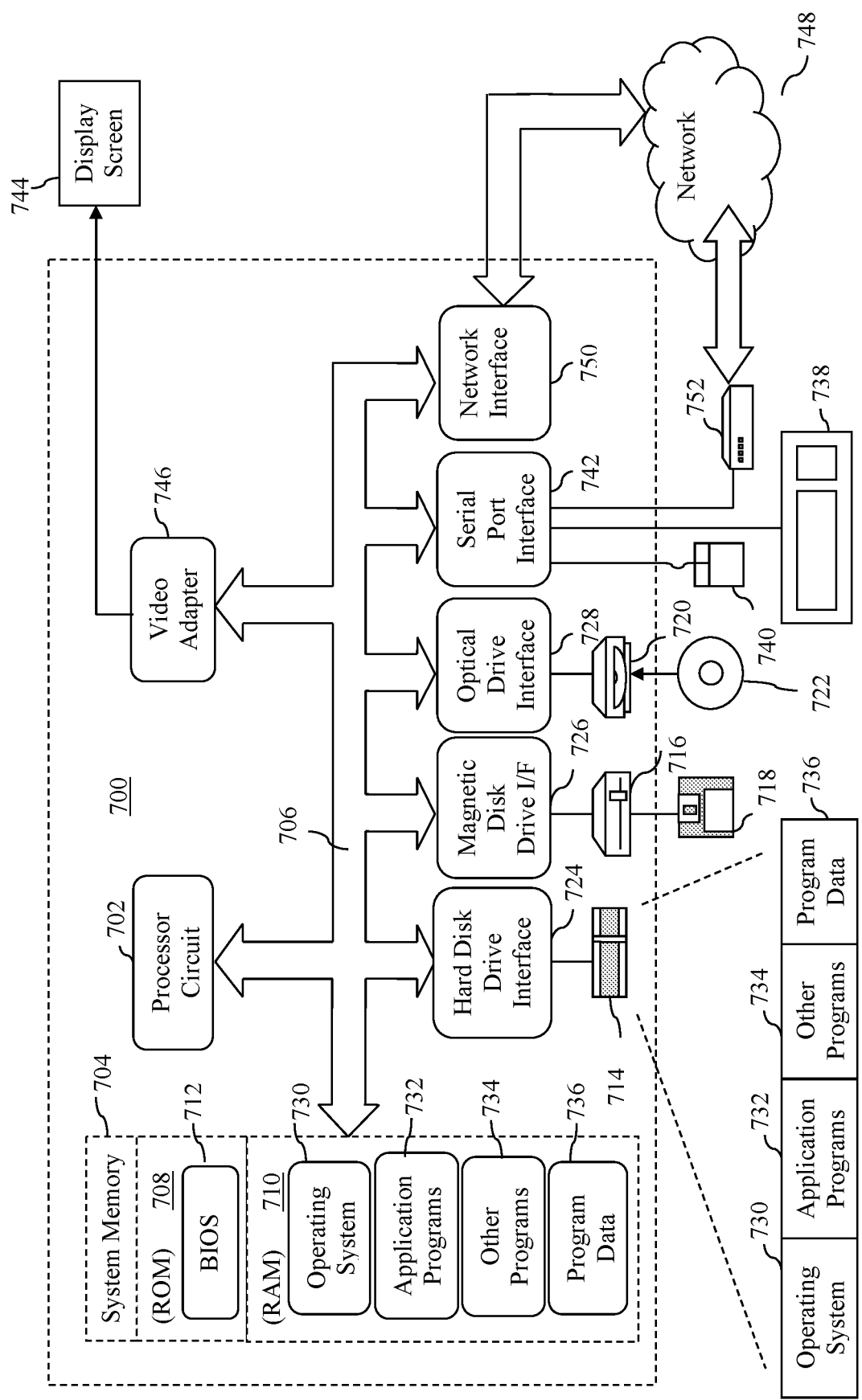
FIG. 7 shows a block diagram of an example computing device that may be used to implement embodiments.

FIG. 7 depicts an exemplary implementation of a computing device 700 in which embodiments may be implemented. For example, any of computing device(s) 102, server 106, recommender system 108, storage 112, and/or content publishing devices 120 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing computing device(s) 102, server 106, recommender system 108, storage 112, content publishing devices 120, flowchart 200, flowchart 400, flowchart 500, and/or flowchart 600 (including any suitable step of flowcharts 200, 400, 500, or 600) and/or further embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments described herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for providing content recommendations is disclosed herein. The system includes: a processing system comprising at least one processor; memory that stores program code configured to be executed by the at least one processor, the program code comprising: an event cataloger configured to store user event records associated with a plurality of media items and a plurality of content types in an event catalog; a content score generator that includes: a user score generator configured to generate a set of user scores for a user based on a user-content score model and the user event records, each generated user score indicating an affinity between the user and a corresponding content type of the plurality of content types, and a title score generator configured to generate a set of title scores for a media item based on a title-content score model and the user event records, each generated title score indicating an affinity between the media item and a corresponding content type of the plurality of content types; and a runtime engine configured to provide a set of content recommendations to a requestor based on combinations of the user scores and the title scores.

In one implementation of the foregoing system, the runtime engine comprises: a content recommendation generator configured to: receive a content recommendation request from the requestor; and generate the set of content recommendations based on the combinations of the user scores and title scores in response to the content recommendation request.

In another implementation of the foregoing system the runtime engine is configured to generate the set of content recommendations based on a linear interpolation of the user scores and the title scores.

In another implementation of the foregoing system, the runtime engine further comprises: a content recommendation score ranker configured to rank the content recommendations.

In another implementation of the foregoing system, the content recommendation score ranker is configured to: receive a real-time signal indicating that a content type is unavailable; determine based on the real-time signal a reduction to a title score; generate a set of final scores based on the user scores, the title scores, a bias factor, and the reduction; and rank the content recommendations based on the final scores.

In another implementation of the foregoing system, the system further comprises: a score publishing pipeline configured to: obtain the set of user scores and title scores; modify the set of title scores; and transmit the user scores and the modified title scores to the runtime engine; and the runtime engine comprises a content recommendation generator configured to generate the set of content recommendations based at least on the user scores and the modified title scores.

In another implementation of the foregoing system, the system further comprises: a normalizer configured to normalize at least one of the sets of user scores and title scores; and the runtime engine comprises a content recommendation generator configured to generate the set of content recommendations based at least on the at least one of the normalized set of user scores and title scores.

A method for providing content recommendations is disclosed herein. The method includes: storing user event records associated with a plurality of media items and a plurality of content types in an event catalog; generating a set of user scores for a user based on a user-content score model and the user event records, each generated user score indicating an affinity between the user and a corresponding content type of the plurality of content types, generating a set of title scores for a media item based on a title-content score model and the user event records, each generated title score indicating an affinity between the media item and a corresponding content type of the plurality of content types; and providing a set of content recommendations to a requestor based on combinations of the user scores and the title scores.

In one implementation of the foregoing method, the providing the set of content recommendations comprises: receiving a content recommendation request from the requestor; and generating the set of content recommendations based on the combinations of the user scores and title scores in response to the content recommendation request.

In another implementation of the foregoing method, the providing the set of content recommendations is based on a linear interpolation of the user scores and the title scores.

In another implementation of the foregoing method, the providing the set of content recommendations comprises: ranking the content recommendations.

In another implementation of the foregoing method, the ranking comprises: receiving a real-time signal indicating that a content type is unavailable; determining based on the real-time signal a reduction to a title score; generating a set of final scores based on the user scores, the title scores, a bias factor, and the reduction; and ranking the content recommendations based on the final scores.

In another implementation of the foregoing method, the method further comprises: obtaining the set of user scores and title scores; modifying the set of title scores; transmitting the user scores and the modified title scores to the runtime engine; and generating the set of content recommendations based at least on the user scores and the modified title scores.

In another implementation of the foregoing method, the method further comprises: normalizing at least one of the sets of user scores and title scores; and the providing the set of content recommendations comprises generating the set of content recommendations based at least on the at least one of the normalized set of user scores and title scores.

A computer program product comprising a computer-readable memory is disclosed herein. The computer program product includes computer program logic recorded thereon that when executed by at least one processor causes the at least one processor to perform a method comprising: storing user event records associated with a plurality of media items and a plurality of content types in an event catalog; generating a set of user scores for a user based on a user-content score model and the user event records, each generated user score indicating an affinity between the user and a corresponding content type of the plurality of content types; generating a set of title scores for a media item based on a title-content score model and the user event records, each generated title score indicating an affinity between the media item and a corresponding content type of the plurality of content types; and providing a set of content recommendations to a requestor based on combinations of the user scores and the title scores.

In one implementation of the foregoing computer program product, the providing the set of content recommendations comprises: receiving a content recommendation request from the requestor; and generating the set of content recommendations based on the combinations of the user scores and title scores in response to the content recommendation request.

In another implementation of the foregoing computer program product, the providing the set of content recommendations comprises: ranking the content recommendations.

In another implementation of the foregoing computer program product, the ranking comprises: receiving a real-time signal indicating that a content type is unavailable; determining based on the real-time signal a reduction to a title score; generating a set of final scores based on the user scores, the title scores, a bias factor, and the reduction; and ranking the content recommendations based on the final scores.

In another implementation of the foregoing computer program product, the method further comprises: obtaining the set of user scores and title scores; modifying the set of title scores; transmitting the user scores and the modified title scores to the runtime engine; and generating the set of content recommendations based at least on the user scores and the modified title scores.

In another implementation of the foregoing computer program product, the method further comprises: normalizing at least one of the sets of user scores and title scores; and wherein the providing the set of content recommendations comprises generating the set of content recommendations based at least on the at least one of the normalized set of user scores and title scores.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system implemented in a server for providing content recommendations to a video game console, comprising:
a processing system comprising at least one processor;
memory that stores program code configured to be executed by the at least one processor, the program code comprising:
an event cataloger configured to store user event records associated with a plurality of video games and a plurality of content types associated with the video games in an event catalog;
a content score generator that includes:
a user score generator configured to:
provide a first set of machine-learning based features to a first trained machine-learning model configured to generate a set of user scores for a particular user, wherein the first set of machine-learning based features is based on the user event records and each generated user score indicates an affinity between the user and a corresponding content type of the plurality of content types associated with the video games, and
receive, from the first trained machine-learning model, the set of user scores; and
a title score generator configured to:
provide a second set of machine-learning based features to a second trained machine-learning model configured to generate a set of title scores for each video game, wherein the second set of machine-learning based features is based on the user event records and each generated title score indicates an affinity between the video game and a corresponding content type of the plurality of content types associated with the video games, and
receive, from the second trained machine-learning model, the set of title scores;
a score publishing pipeline configured to:
receive an indication of time sensitive content associated with a particular video game, and
generate a modified set of title scores based at least on the indication of time sensitive content associated with the particular video game; and
a runtime engine configured to provide, from the server to the video game console, a set of content recommendations based on combinations of the user scores and the modified set of title scores.

2. The system of claim 1, wherein the runtime engine comprises:
a content recommendation generator configured to:
receive a content recommendation request from the video game console; and
generate the set of content recommendations based on the combinations of the user scores and modified set of title scores in response to the content recommendation request.

3. The system of claim 2, wherein the runtime engine is configured to generate the set of content recommendations based on a linear interpolation of the user scores and the modified set of title scores.

4. The system of claim 1, wherein the runtime engine further comprises:
a content recommendation score ranker configured to rank the content recommendations.

5. The system of claim 4, wherein the content recommendation score ranker is configured to:
receive a real-time signal indicating that a content type is unavailable;
determine based on the real-time signal a reduction to a title score;
generate a set of final scores based on the user scores, the modified set of title scores, a bias factor, and the reduction; and
rank the content recommendations based on the final scores.

6. The system of claim 1, wherein the indication of time sensitive content associated with the particular video game identifies content that was generated after generation of the set of title scores.

7. The system of claim 1, further comprising:
a normalizer configured to normalize at least one of the sets of user scores and the modified set of title scores; and
wherein the runtime engine comprises:
a content recommendation generator configured to generate the set of content recommendations based at least on the at least one of the normalized set of user scores and the modified set of title scores.

8. A method implemented by a server for providing content recommendations to a video game console, comprising:
storing user event records associated with a plurality of media items and a plurality of content types in an event catalog;
providing a first set of machine-learning based features to a first trained machine-learning model configured to generate a set of user scores for a particular user, wherein the first set of machine-learning based features is based on the user event records and each generated user score indicates an affinity between the user and a corresponding content type of the plurality of content types associated with the video games;
receiving, from the first trained machine-learning model, the set of user scores;
providing a second set of machine-learning based features to a second trained machine-learning model configured to generate a set of title scores for each video game, wherein the second set of machine-learning based features is based on the user event records and each generated title score indicates an affinity between the video game and a corresponding content type of the plurality of content types associated with the video games;
receiving, from the second trained machine-learning model, the set of title scores;
receiving an indication of time sensitive content associated with a particular video game;
generating a modified set of title scores based at least on the indication of time sensitive content associated with the particular video game; and
providing, from the server to the video game console, a set of content recommendations based on combinations of the user scores and the modified set of title scores.

9. The method of claim 8, wherein said providing the set of content recommendations comprises:
    receiving a content recommendation request from the video game console; and
    generating the set of content recommendations based on the combinations of the user scores and the modified set of title scores in response to the content recommendation request.

10. The method of claim 9, wherein said providing the set of content recommendations is based on a linear interpolation of the user scores and the modified set of title scores.

11. The method of claim 8, wherein said providing the set of content recommendations comprises:
    ranking the content recommendations.

12. The method of claim 11, wherein said ranking comprises:
    receiving a real-time signal indicating that a content type is unavailable;
    determining based on the real-time signal a reduction to a title score;
    generating a set of final scores based on the user scores, the modified set of title scores, a bias factor, and the reduction; and
    ranking the content recommendations based on the final scores.

13. The method of claim 8, wherein the indication of time sensitive content associated with the particular video game identifies content that was generated after generation of the set of title scores.

14. The method of claim 8, further comprising:
    normalizing at least one of the sets of user scores and the modified set of title scores; and
    wherein said providing the set of content recommendations comprises
        generating the set of content recommendations based at least on the at least one of the normalized set of user scores and modified set of title scores.

15. A computer program product comprising a computer-readable memory having computer program logic recorded thereon that when executed by at least one processor of a server causes the at least one processor to perform a method comprising:
    storing user event records associated with a plurality of media items and a plurality of content types in an event catalog;
    providing a first set of machine-learning based features to a first trained machine-learning model configured to generate a set of user scores for a particular user, wherein the first set of machine-learning based features is based on the user event records and each generated user score indicates an affinity between the user and a corresponding content type of the plurality of content types associated with the video games;
    receiving, from the first trained machine-learning model, the set of user scores;
    providing a second set of machine-learning based features to a second trained machine-learning model configured to generate a set of title scores for each video game, wherein the second set of machine-learning based features is based on the user event records and each generated title score indicates an affinity between the video game and a corresponding content type of the plurality of content types associated with the video games;
    receiving, from the second trained machine-learning model, the set of title scores;
    receiving an indication of time sensitive content associated with a particular video game;
    generating a modified set of title scores based at least on the indication of time sensitive content associated with the particular video game; and
    providing, from the server to a video game console, a set of content recommendations based on combinations of the user scores and the modified set of title scores.

16. The computer program product of claim 15, wherein said providing the set of content recommendations comprises:
    receiving a content recommendation request from the video game console; and
    generating the set of content recommendations based on the combinations of the user scores and modified set of title scores in response to the content recommendation request.

17. The computer program product of claim 15, wherein said providing the set of content recommendations comprises:
    ranking the content recommendations.

18. The computer program product of claim 17, wherein said ranking comprises:
    receiving a real-time signal indicating that a content type is unavailable;
    determining based on the real-time signal a reduction to a title score;
    generating a set of final scores based on the user scores, the modified set of title scores, a bias factor, and the reduction; and
    ranking the content recommendations based on the final scores.

19. The computer program product of claim 15, wherein the indication of time sensitive content associated with the particular video game identifies content that was generated after generation of the set of title scores.

20. The computer program product of claim 15, further comprising:
    normalizing at least one of the sets of user scores and the modified set of title scores; and
    wherein said providing the set of content recommendations comprises:
        generating the set of content recommendations based at least on the at least one of the normalized set of user scores and the modified set of title scores.

* * * * *